US008921232B2

(12) United States Patent
Araki et al.

(10) Patent No.: US 8,921,232 B2
(45) Date of Patent: Dec. 30, 2014

(54) TAPER-ETCHING METHOD AND METHOD OF MANUFACTURING NEAR-FIELD LIGHT GENERATOR

(71) Applicants: Hironori Araki, Milpitas, CA (US); Yoshitaka Sasaki, Santa Clara, CA (US); Hiroyuki Ito, Milpitas, CA (US); Shigeki Tanemura, Milpitas, CA (US)

(72) Inventors: Hironori Araki, Milpitas, CA (US); Yoshitaka Sasaki, Santa Clara, CA (US); Hiroyuki Ito, Milpitas, CA (US); Shigeki Tanemura, Milpitas, CA (US)

(73) Assignee: Milipitas

( * ) Notice: Subject to any disclaimer, the term of this patent is extended or adjusted under 35 U.S.C. 154(b) by 0 days.

(21) Appl. No.: 14/189,574

(22) Filed: Feb. 25, 2014

(65) Prior Publication Data

US 2014/0175053 A1    Jun. 26, 2014

Related U.S. Application Data

(63) Continuation of application No. 13/353,834, filed on Jan. 19, 2012, now Pat. No. 8,703,619.

(51) Int. Cl.
| | |
|---|---|
| H01L 21/302 | (2006.01) |
| H01L 21/461 | (2006.01) |
| G11B 5/31 | (2006.01) |
| B44C 1/22 | (2006.01) |
| G11B 7/22 | (2006.01) |

(52) U.S. Cl.
CPC ... G11B 5/31 (2013.01); B44C 1/22 (2013.01); G11B 7/22 (2013.01)
USPC ........... 438/706; 438/709; 438/713; 438/714; 438/723; 438/724; 438/743; 438/744; 216/58; 216/72; 216/74; 216/75

(58) Field of Classification Search
None
See application file for complete search history.

(56) References Cited

U.S. PATENT DOCUMENTS

| | | | | |
|---|---|---|---|---|
| 4,919,748 | A | * | 4/1990 | Bredbenner et al. .......... 438/656 |
| 5,728,608 | A | * | 3/1998 | Su et al. ........................ 438/149 |
| 5,895,937 | A | * | 4/1999 | Su et al. .......................... 257/59 |
| 6,784,108 | B1 | | 8/2004 | Donohoe et al. |
| 7,911,883 | B2 | | 3/2011 | Sasaki et al. |
| 8,120,137 | B2 | | 2/2012 | Smith et al. |
| 8,461,050 | B2 | | 6/2013 | Araki et al. |
| 2009/0017259 | A1 | | 1/2009 | Nakagawa et al. |
| 2010/0159702 | A1 | | 6/2010 | Yamada et al. |
| 2010/0290323 | A1 | | 11/2010 | Isogai et al. |
| 2010/0297849 | A1 | | 11/2010 | Miyake et al. |
| 2011/0303637 | A1 | | 12/2011 | Araki et al. |

OTHER PUBLICATIONS

Jul. 10, 2013 Office Action issued in U.S. Appl. No. 13/353,834.
Dec. 10, 2013 Notice of Allowance issued in U.S. Appl. No. 13/353,834.

* cited by examiner

*Primary Examiner* — Duy Deo
(74) *Attorney, Agent, or Firm* — Oliff PLC

(57) ABSTRACT

A method of taper-etching a layer to be etched that is made of a dielectric material and has a top surface. The method includes the steps of: forming an etching mask with an opening on the top surface of the layer to be etched; and taper-etching a portion of the layer to be etched, the portion being exposed from the opening, by reactive ion etching so that a groove having two wall faces intersecting at a predetermined angle is formed in the layer to be etched. The step of taper-etching employs an etching gas containing a first gas contributing to the etching of the layer to be etched and a second gas contributing to the deposition of a sidewall protective film, and changes, during the step, the ratio of the flow rate of the second gas to the flow rate of the first gas so that the ratio increases.

8 Claims, 10 Drawing Sheets

TAPER-ETCHING METHOD AND METHOD OF MANUFACTURING NEAR-FIELD LIGHT GENERATOR

This is a Continuation of application Ser. No. 13/353,834 filed Jan. 19, 2012. The disclosure of the prior application is hereby incorporated by reference herein in its entirety.

BACKGROUND OF THE INVENTION

1. Field of the Invention

The present invention relates to a taper-etching method for forming a groove having a V-shaped cross section in a layer to be etched that is made of a dielectric material, and to a method of manufacturing a near-field light generator using the taper-etching method.

2. Description of the Related Art

Recently, magnetic recording devices such as magnetic disk drives have been improved in recording density, and thin-film magnetic heads and recording media of improved performance have been demanded accordingly. Among the thin-film magnetic heads, a composite thin-film magnetic head has been used widely. The composite thin-film magnetic head has such a structure that a read head including a magnetoresistive element (hereinafter, also referred to as MR element) for reading and a write head including an induction-type electromagnetic transducer for writing are stacked on a substrate. In a magnetic disk drive, the thin-film magnetic head is mounted on a slider that flies slightly above the surface of the magnetic recording medium.

To increase the recording density of a magnetic recording device, it is effective to make the magnetic fine particles of the recording medium smaller. Making the magnetic fine particles smaller, however, causes the problem that the magnetic fine particles drop in the thermal stability of magnetization. To solve this problem, it is effective to increase the anisotropic energy of the magnetic fine particles. However, increasing the anisotropic energy of the magnetic fine particles leads to an increase in coercivity of the recording medium, and this makes it difficult to perform data writing with existing magnetic heads.

To solve the foregoing problems, there has been proposed a technology so-called thermally-assisted magnetic recording. The technology uses a recording medium having high coercivity. When writing data, a write magnetic field and heat are simultaneously applied to the area of the recording medium where to write data, so that the area rises in temperature and drops in coercivity for data writing. The area where data is written subsequently falls in temperature and rises in coercivity to increase the thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating the near-field light is typically guided through a waveguide, which is provided in the slider, to the plasmon generator disposed near a medium facing surface of the slider.

U.S. Patent Application Publication No. 2010/0290323 A1 discloses a technology for coupling the light that propagates through the waveguide with the plasmon generator in surface plasmon mode via a buffer part, thereby exciting surface plasmons on the plasmon generator.

Here, a description will be given of an example of the shape of the plasmon generator and the arrangement of the plasmon generator and the waveguide. In this example, the plasmon generator is disposed above the top surface of the core of the waveguide. The plasmon generator has an edge part facing the top surface of the core of the waveguide. A cladding is disposed around the core. The cladding includes a portion lying between the edge part of the plasmon generator and the top surface of the core, and this portion of the cladding serves as the buffer part.

In the aforementioned plasmon generator, an end of the edge part located in the medium facing surface serves as a near-field light generating part. In the plasmon generator, the light that propagates through the core is totally reflected at the top surface of the core. This causes evanescent light to occur from the top surface of the core. Then, at least on the edge part of the plasmon generator, surface plasmons are excited through coupling with the aforementioned evanescent light. The surface plasmons propagate along the edge part to reach the near-field light generating part, and near-field light is generated from the near-field light generating part based on the surface plasmons. Such a configuration allows the surface plasmons excited on the plasmon generator to propagate to the near-field light generating part with high efficiency.

The aforementioned configuration can be formed in the following manner. First, a layer to be etched is formed using a dielectric material that is to be employed for the cladding. Part of the layer to be etched is located on the top surface of the core. Then, a groove that is V-shaped in cross section parallel to the medium facing surface (hereinafter, also referred to as V-shaped groove) is formed in the layer to be etched. This groove is formed not to reach the top surface of the core. Being provided with the groove, the layer to be etched becomes part of the cladding. The plasmon generator is then formed in the groove.

In the aforementioned configuration, the V-shaped groove has two wall faces that intersect at a predetermined angle, and the plasmon generator has two slopes that are opposed to the two wall faces. The two slopes of the plasmon generator intersect each other to form the edge part of the plasmon generator. The angle between the two slopes affects the intensity of surface plasmons excited on the plasmon generator and the spot diameter of the near-field light generated from the near-field light generating part. As the angle between the two slopes decreases, the edge part becomes sharper and the near-field light generated from the near-field light generating part decreases in spot diameter. To increase the intensity of the surface plasmons excited on the plasmon generator, however, the angle between the two slopes is preferably increased to some extent. This means that there is a preferred range for the angle between the two slopes. By way of example, the angle between the two slopes preferably falls within the range of 50° to 120°. The angle between the two slopes can be defined within the range of 50° to 120° by allowing each of the two wall faces of the V-shaped groove to form an angle (hereinafter referred to as inclination angle) in the range of 25° to 60° with respect to the direction perpendicular to the top surface of the layer to be etched, so that the angle between the two wall faces fall within the range of 50° to 120°.

A method for forming a V-shaped groove in a layer to be etched that will later become part of the cladding is to taper-etch the layer to be etched by employing reactive ion etching (hereinafter, also referred to as RIE). Generally in this method, an etching gas that contains a main component gas contributing to the etching of the layer to be etched and a gas for forming a sidewall protective film is used to taper-etch the layer to be etched. The V-shaped groove is formed by allowing the sidewall protective film to get deposited on the sidewalls of the groove being etched. The sidewall protective film is formed of a reaction product produced during the etching. The inclination angle of each of the two wall faces of the V-shaped groove depends on the ratio of the deposition rate of the sidewall protective film to the etching rate of the layer to be etched.

The aforementioned taper-etching by RIE gradually increases the depth of the groove being etched and gradually decreases the distance between the two sidewalls at the bottom of the groove. In general, as the depth of the groove being etched increases and the distance between the two sidewalls at the bottom of the groove decreases, in the region near the bottom of the groove the etching becomes predominant over the deposition of the sidewall protective film. Accordingly, for a V-shaped groove that is formed by taper-etching employing the conventional RIE, the inclination angle of each of the two wall faces decreases with increasing proximity to the lower end of the groove. As such, it has been difficult with the taper-etching by the conventional RIE to form a V-shaped groove having two wall faces that each form a constant or almost constant inclination angle from the opening to lower end of the groove.

OBJECTS AND SUMMARY OF THE INVENTION

It is a first object of the present invention to provide a taper-etching method that allows forming a groove in a layer to be etched that is made of a dielectric material, the groove having two wall faces that each form a constant or almost constant inclination angle from the opening to lower end of the groove and that intersect at a predetermined angle.

It is a second object of the present invention to provide a method of manufacturing a near-field light generator including a waveguide and a plasmon generator. The waveguide includes a core and a cladding. The cladding includes a cladding layer having a groove located above the top surface of the core. The groove has two wall faces that each form a constant or almost constant inclination angle from the opening to lower end of the groove and that intersect at a predetermined angle. The plasmon generator has two slopes opposed to the two wall faces. According to the method, the aforementioned groove is formed in a layer to be etched that is made of a dielectric material to thereby form the cladding layer.

A taper-etching method of the present invention is a method of taper-etching a layer to be etched. The layer to be etched is made of a dielectric material and has a top surface. The method includes the steps of: forming an etching mask on the top surface of the layer to be etched, the etching mask having an opening; and taper-etching a portion of the layer to be etched, the portion being exposed from the opening, by reactive ion etching so that a groove having two wall faces that intersect at a predetermined angle is formed in the layer to be etched. The step of taper-etching employs an etching gas containing a first gas contributing to the etching of the layer to be etched and a second gas contributing to deposition of a sidewall protective film, and changes, during the step, the ratio of the flow rate of the second gas to the flow rate of the first gas so that the ratio increases.

A method of manufacturing a near-field light generator of the present invention is a method by which a near-field light generator including a waveguide and a plasmon generator is manufactured. The waveguide includes a core through which light propagates, and a cladding that surrounds the core. The core has a top surface. The cladding includes a cladding layer that has a groove located above the top surface of the core. The groove has two wall faces that intersect at a predetermined angle. The plasmon generator has: two slopes that are opposed to the two wall faces; an edge part defined by the two slopes intersecting each other; and a near-field light generating part located at an end of the edge part and generating near-field light. The light propagating through the core is totally reflected at the top surface of the core to cause evanescent light to occur from the top surface of the core. A surface plasmon is excited on the edge part through coupling with the evanescent light, and the surface plasmon propagates along the edge part to the near-field light generating part. The near-field light generating part generates near-field light based on the surface plasmon.

The method of manufacturing the near-filed light generator of the present invention includes the steps of: forming the core; forming the cladding; and forming the plasmon generator. The step of forming the cladding includes the steps of: forming a layer to be etched that is made of a dielectric material and has a top surface; forming an etching mask on the top surface of the layer to be etched, the etching mask having an opening; and taper-etching a portion of the layer to be etched, the portion being exposed from the opening, by reactive ion etching so that the groove is formed in the layer to be etched and the layer to be etched thereby becomes the cladding layer. The step of taper-etching employs an etching gas containing a first gas contributing to the etching of the layer to be etched and a second gas contributing to deposition of a sidewall protective film, and changes, during the step, the ratio of the flow rate of the second gas to the flow rate of the first gas so that the ratio increases.

In the taper-etching method and the method of manufacturing the near-field light generator of the present invention, the step of taper-etching may increase the ratio of the flow rate of the second gas to the flow rate of the first gas in a stepwise or stepless manner.

In the taper-etching method and the method of manufacturing the near-field light generator of the present invention, the first gas may contain $Cl_2$ and $BCl_3$.

In the taper-etching method and the method of manufacturing the near-field light generator of the present invention, the layer to be etched may be made of $Al_2O_3$, and the second gas may contain at least one of $N_2$ and $CF_4$.

In the taper-etching method and the method of manufacturing the near-field light generator of the present invention, the layer to be etched may be made of $SiO_2$ or $SiON$, the etching mask may contain elemental Al, and the second gas may contain $N_2$.

In the taper-etching method of the present invention, the ratio of the flow rate of the second gas contributing to the deposition of the sidewall protective film to the flow rate of the first gas contributing to the etching of the layer to be etched is changed during the step of taper-etching so that the ratio increases. As the etching proceeds in the layer to be etched, the depth of the groove being etched increases and the distance between the two sidewalls at the bottom of the groove decreases. In this situation, according to the present invention, it is possible that in a region near the bottom of the groove, the advancement of the etching can be retarded and the formation of the sidewall protective film can be accelerated so as to prevent the etching from becoming predominant over the deposition of the sidewall protective film. The present invention thus makes it possible to form, in a layer to be etched that is made of a dielectric material, a groove having two wall faces that each form a constant or almost constant inclination angle from the opening to lower end of the groove and that intersect at a predetermined angle.

According to the method of manufacturing the near-field light generator of the present invention, the aforementioned operation makes it possible to form the cladding layer by forming, in a layer to be etched that is made of a dielectric material, a groove located above the top surface of the core and having two wall faces that each form a constant or almost constant inclination angle from the opening to lower end of the groove and that intersect at a predetermined angle.

Other and further objects, features and advantages of the present invention will appear more fully from the following description.

DETAILED DESCRIPTION OF THE PREFERRED EMBODIMENTS

First Embodiments

Figure 1:
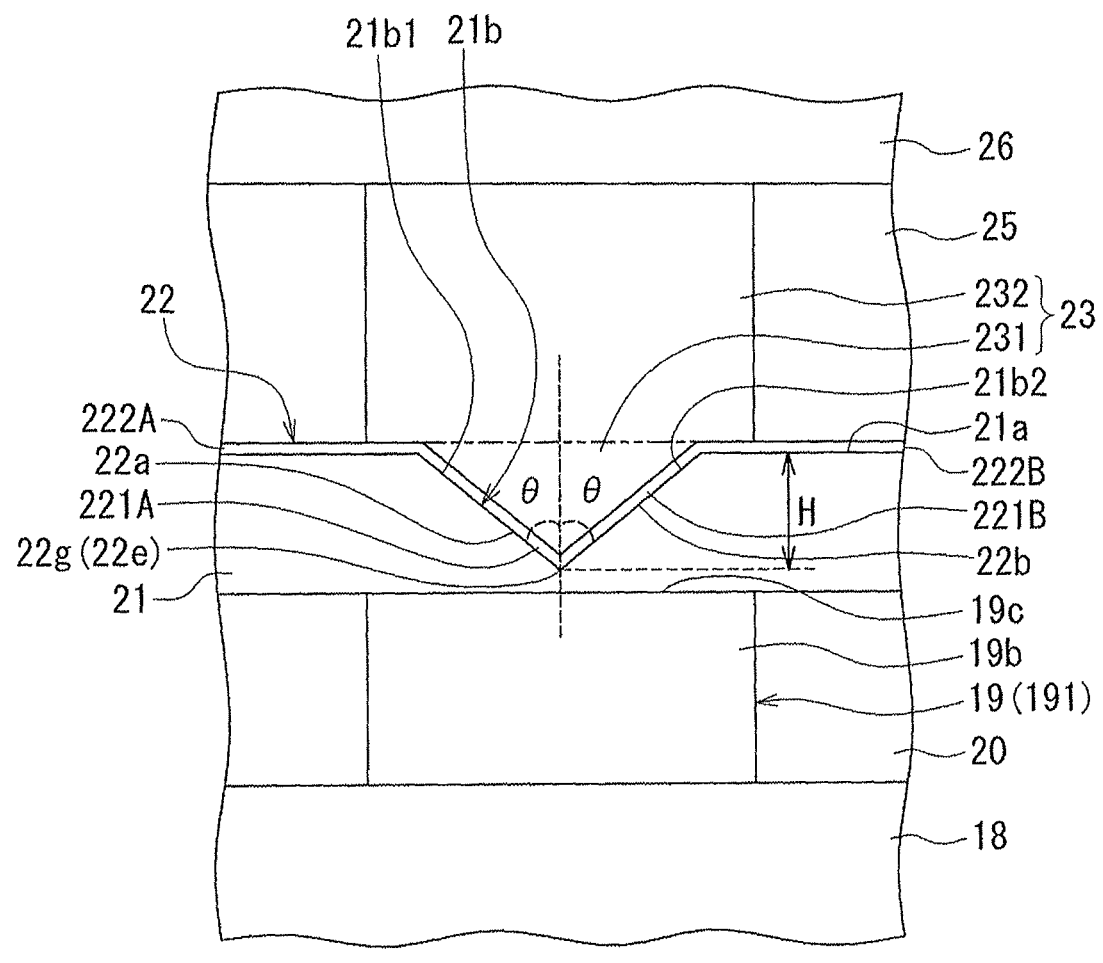
FIG. 1 is a front view showing part of the medium facing surface of a thermally-assisted magnetic recording head of a first embodiment of the invention.
Figure 1:
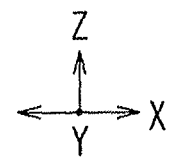
Figure 2:
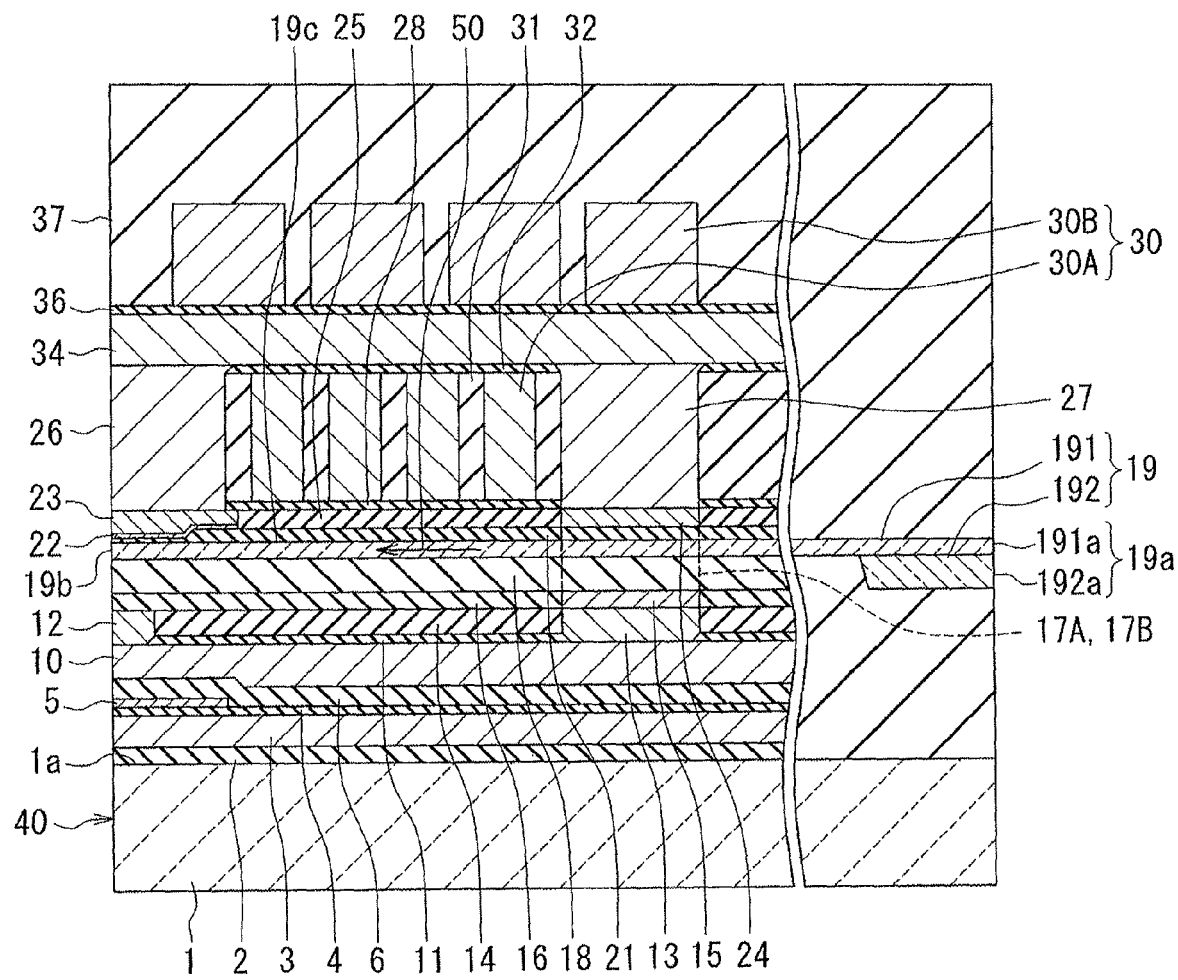
FIG. 2 is a cross-sectional view showing the configuration of the thermally-assisted magnetic recording head of the first embodiment of the invention.
Figure 2:
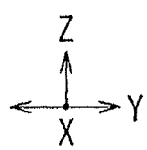
Figure 3:
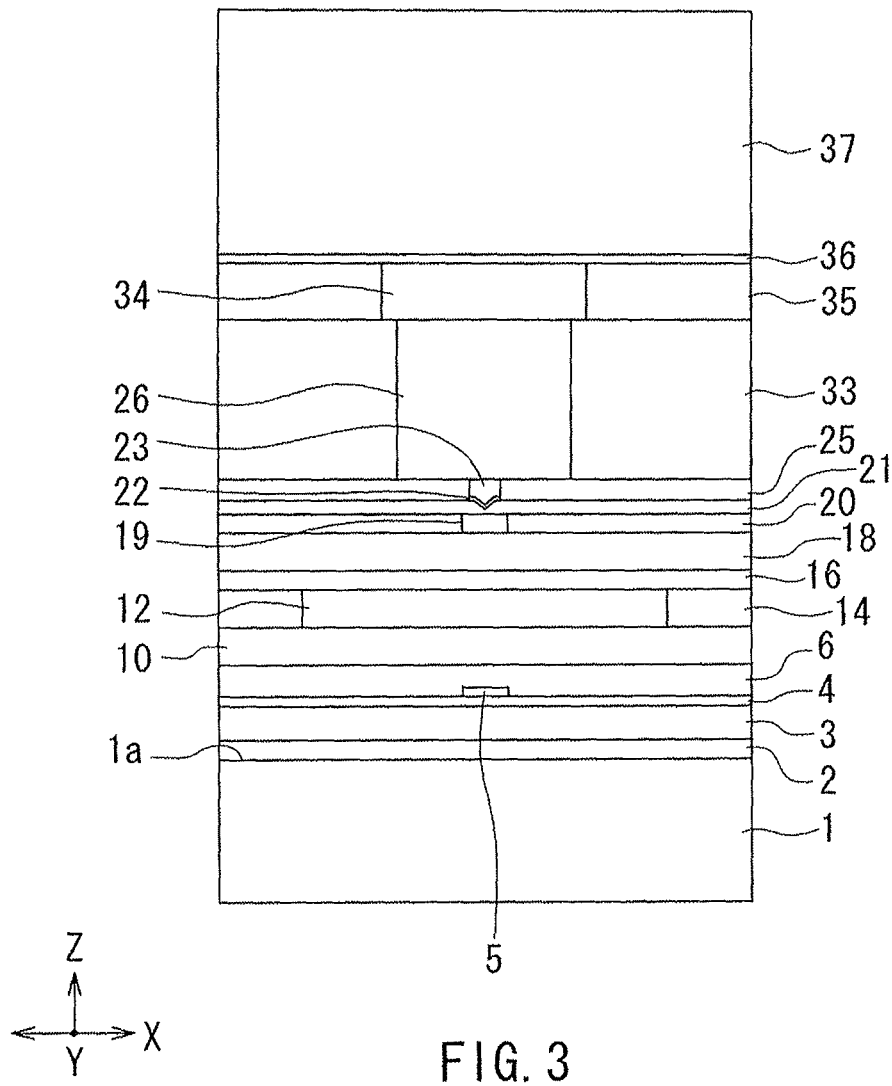
FIG. 3 is a front view showing the medium facing surface of the thermally-assisted magnetic recording head of the first embodiment of the invention.

Preferred embodiments of the present invention will now be described in detail with reference to the drawings. First, reference is made to FIG. 1 to FIG. 3 to describe the configuration of a thermally-assisted magnetic recording head of a first embodiment of the invention. FIG. 1 is a front view showing part of the medium facing surface of the thermally-assisted magnetic recording head. FIG. 2 is a cross-sectional view showing the configuration of the thermally-assisted magnetic recording head. FIG. 3 is a front view showing the medium facing surface of the thermally-assisted magnetic recording head.

The thermally-assisted magnetic recording head of the present embodiment is for use in perpendicular magnetic recording, and is in the form of a slider to fly over the surface of a recording medium that rotates. When the recording medium rotates, an airflow passing between the recording medium and the slider causes a lift to be exerted on the slider. The slider is configured to fly over the surface of the recording medium by means of the lift.

As shown in FIG. 2, the thermally-assisted magnetic recording head has a medium facing surface 40 that faces the recording medium. Here, X direction, Y direction, and Z direction will be defined as follows. The X direction is the direction across the tracks of the recording medium, i.e., the track width direction. The Y direction is a direction perpendicular to the medium facing surface 40. The Z direction is the direction of travel of the recording medium as viewed from the slider. The X, Y, and Z directions are orthogonal to one another.

As shown in FIG. 2 and FIG. 3, the thermally-assisted magnetic recording head includes: a substrate 1 made of a ceramic material such as aluminum oxide-titanium carbide ($Al_2O_3$—TiC) and having a top surface 1a: an insulating layer 2 made of an insulating material and disposed on the top surface 1a of the substrate 1; and a bottom shield layer 3 made of a magnetic material and disposed on the insulating layer 2. The insulating layer 2 is made of alumina ($Al_2O_3$), for example. The Z direction is also a direction perpendicular to the top surface 1a of the substrate 1.

The thermally-assisted magnetic recording head further includes: a bottom shield gap film 4 which is an insulating film disposed on the top surface of the bottom shield layer 3; a magnetoresistive (MR) element 5 serving as a read element disposed on the bottom shield gap film 4; two leads (not shown) connected to the MR element 5; and a top shield gap film 6 which is an insulating film disposed on the MR element 5.

An end of the MR element 5 is located in the medium facing surface 40 facing the recording medium. The MR element 5 may be an element made of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current used for detecting magnetic signals is fed in a direction generally parallel to the plane of layers constituting the GMR element or the current-perpendicular-to-plane (CPP) type in which the current used for detecting magnetic signals is fed in a direction generally perpendicular to the plane of layers constituting the GMR element.

The thermally-assisted magnetic recording head further includes: a return pole layer 10 made of a magnetic material and disposed on the top shield gap film 6; a not-shown insulating layer disposed on the top shield gap film 6 and surrounding the return pole layer 10; and an insulating layer 11 disposed on part of the top surface of the return pole layer 10. The not-shown insulating layer and the insulating layer 11 are made of alumina, for example.

The thermally-assisted magnetic recording head further includes: a shield layer 12 made of a magnetic material and disposed on the return pole layer 10 in the vicinity of the medium facing surface 40; a coupling layer 13 made of a magnetic material and disposed on the return pole layer 10 at a position that is farther from the medium facing surface 40 than is the position of the shield layer 12; and an insulating layer 14 disposed around the shield layer 12 and the coupling layer 13. The shield layer 12 has an end face located in the medium facing surface 40. The insulating layer 14 is made of alumina, for example.

The thermally-assisted magnetic recording head further includes a coupling layer 15 made of a magnetic material and disposed on the coupling layer 13, and an insulating layer 16 disposed over the shield layer 12 and the insulating layer 14 and surrounding the coupling layer 15. The insulating layer 16 is made of alumina, for example. The top surfaces of the coupling layer 15 and the insulating layer 16 are even with each other.

The thermally-assisted magnetic recording head further includes a waveguide including a core 19 and a cladding. The cladding surrounds the core 19 and includes cladding layers 18, 20, and 21. The cladding layer 18 lies over the coupling layer 15 and the insulating layer 16. The core 19 is disposed on the cladding layer 18. The cladding layer 20 lies on the cladding layer 18 and surrounds the core 19. The top surfaces of the core 19 and the cladding layer 20 are even with each other. The cladding layer 21 lies over the core 19 and the cladding layer 20.

The core 19 has an incidence part 19a, an end face 19b that is closer to the medium facing surface 40, and a top surface 19c. The end face 19b may be located in the medium facing surface 40 or at a distance from the medium facing surface 40. FIG. 1 to FIG. 3 show an example where the end face 19b is located in the medium facing surface 40.

The core 19 includes a first layer 191 and a second layer 192. The first layer 191 includes the aforementioned end face 19b and top surface 19c, and has a bottom surface. The first layer 191 extends in a direction perpendicular to the medium facing surface 40 (the Y direction). The second layer 192 is disposed along the bottom surface of the first layer 191 and bonded to the bottom surface. The first layer 191 has an incidence end face 191a that constitutes a portion of the incidence part 19a. The second layer 192 has an incidence end face 192a that constitutes another portion of the incidence part 19a. Laser light emitted from a not-shown laser diode is incident on the incidence part 19a and propagates through the core 19. The cladding layers 18, 20 and 21 are each formed of a dielectric material that has a refractive index lower than that of the core 19. For example, the core 19 may be formed of tantalum oxide such as $Ta_2O_5$, or of SiON. The cladding layers 18, 20 and 21 may be formed of alumina, $SiO_2$, or SiON, for example. In the present embodiment, the cladding layer 21 is formed of alumina, in particular.

As shown in FIG. 1, the cladding layer 21 has a top surface 21a, and a groove 21b located above the top surface 19c of the core 19. The groove 21b is V-shaped in cross section parallel to the medium facing surface 40. The groove 21b has two wall faces 21b1 and 21b2 that intersect at a predetermined angle. The groove 21b has a lower end that faces the top surface 19c of the core 19 with a predetermined gap therebetween and that extends in the direction perpendicular to the medium facing surface 40 (the Y direction). Here, as shown in FIG. 1, the angle that each of the two wall faces 21b1 and 21b2 forms with respect to the direction perpendicular to the top surface 21a will be referred to as the inclination angle and represented by the symbol θ. In the present embodiment, in particular, the inclination angle θ of each of the two wall faces 21b1 and 21b2 is constant or almost constant from the opening to lower end of the groove 21b. The angle between the two wall faces 21b1 and 21b2 is twice the inclination angle θ of the wall faces 21b1 and 21b2, that is, 2θ. The angle 2θ preferably falls within the range of 50° to 120°, for example. The depth (the dimension in the Z direction) of the groove 21b will be represented by the symbol H. The depth H preferably falls within the range of 0.05 to 0.3 μm, for example.

The thermally-assisted magnetic recording head further includes a plasmon generator 22 and a main pole 23. The plasmon generator 22 is disposed above the top surface 19c of the core 19 in the vicinity of the medium facing surface 40. The main pole 23 is made of a magnetic material and disposed such that the plasmon generator 22 is interposed between the core 19 and the main pole 23. At least part of the plasmon generator 22 is accommodated in the groove 21b of the cladding layer 21. The plasmon generator 22 is made of a metal. More specifically, the plasmon generator 22 is made of, for example, one of Au, Ag, Al, Cu, Pd, Pt, Rh and Ir, or of an alloy composed of two or more of these elements. A detailed description will be made later as to the shapes of the plasmon generator 22 and the main pole 23.

The thermally-assisted magnetic recording head further includes two coupling portions 17A and 17B embedded in the cladding layers 18, 20 and 21 at positions away from the medium facing surface 40. The coupling portions 17A and 17B are made of a magnetic material. The coupling portions 17A and 17B are located on opposite sides of the core 19 in the track width direction (the X direction), each being spaced from the core 19. Although not shown, each of the coupling portions 17A and 17B includes a first layer located on the coupling layer 15, and a second layer and a third layer stacked in this order on the first layer.

The thermally-assisted magnetic recording head further includes a coupling layer 24 made of a magnetic material and disposed on the coupling portions 17A and 17B, and an insulating layer 25 disposed on the cladding layer 21 and surrounding the main pole 23 and the coupling layer 24. The insulating layer 25 is made of alumina, for example. The top surfaces of the main pole 23, the coupling layer 24, and the insulating layer 25 are even with each other.

The thermally-assisted magnetic recording head further includes a coupling layer 26 made of a magnetic material and disposed on the main pole 23, and a coupling layer 27 made of a magnetic material and disposed on the coupling layer 24.

Figure 4:
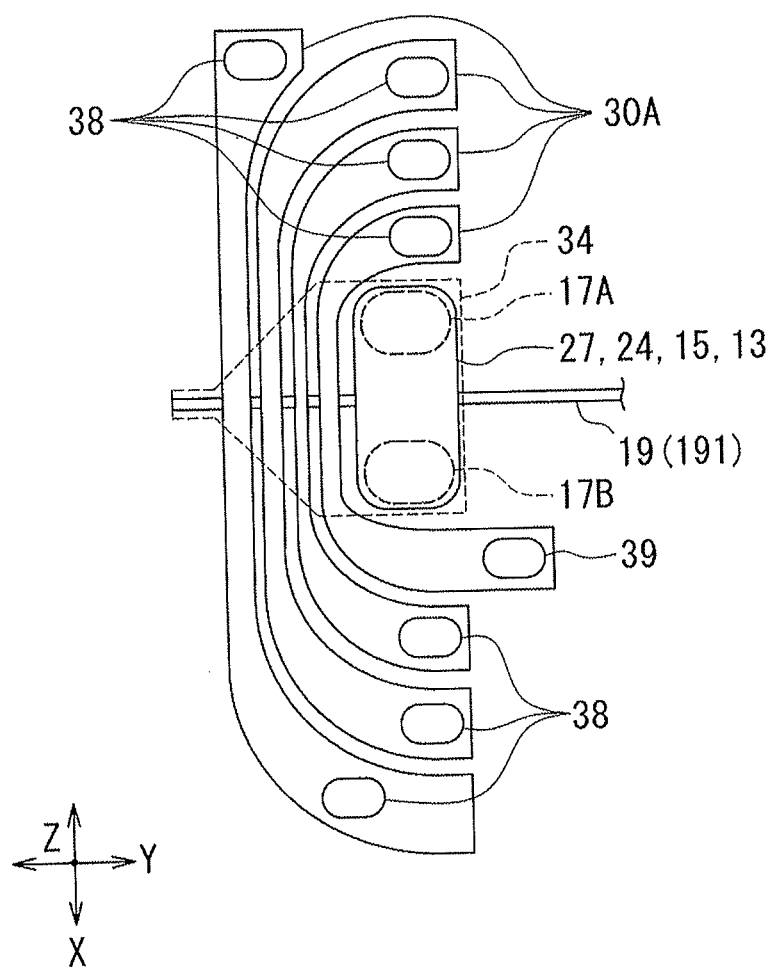
FIG. 4 is a plan view showing a first layer of a coil of the thermally-assisted magnetic recording head of the first embodiment of the invention.

The thermally-assisted magnetic recording head further includes an insulating layer 28 disposed on the insulating layer 25, a plurality of first coil elements 30A disposed on the insulating layer 28, an insulating layer 31 disposed around the plurality of first coil elements 30A, an insulating layer 32 disposed to cover the plurality of first coil elements 30A and the insulating layer 31, and an insulating layer 33 disposed around the coupling layers 26 and 27 and the insulating layer 31. FIG. 4 shows the plurality of first coil elements 30A. The plurality of first coil elements 30A are arranged side by side in the Y direction. Each first coil element 30A has a main part extending in the track width direction (the X direction). Each first coil element 30A is made of a conductive material such as copper. The insulating layers 28 and 31 to 33 are made of alumina, for example.

The thermally-assisted magnetic recording head further includes a yoke layer 34 made of a magnetic material and disposed over the coupling layers 26 and 27 and the insulating layer 32, and an insulating layer 35 disposed around the yoke layer 34. The yoke layer 34 magnetically couples the coupling layer 26 to the coupling layer 27. The insulating layer 35 is made of alumina, for example. The top surfaces of the yoke layer 34 and the insulating layer 35 are even with each other.

The thermally-assisted magnetic recording head further includes: an insulating layer 36 disposed over the yoke layer 34 and the insulating layer 35; a plurality of second coil elements 30B and a lead layer 30C disposed on the insulating layer 36; and a protective layer 37 disposed to cover the plurality of second coil elements 30B and the lead layer 30C. The insulating layer 36 and the protective layer 37 are made of alumina, for example.

Figure 5:
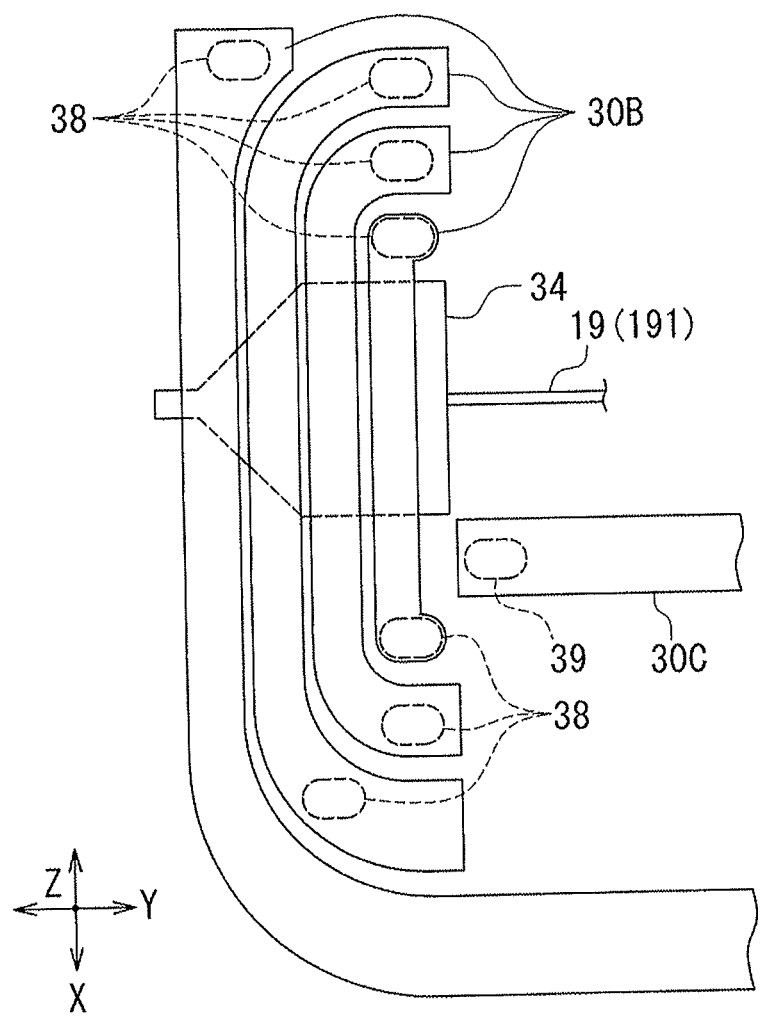
FIG. 5 is a plan view showing a second layer of the coil of the thermally-assisted magnetic recording head of the first embodiment of the invention.

FIG. 5 shows the plurality of second coil elements 30B and the lead layer 30C. The plurality of second coil elements 30B are arranged side by side in the Y direction. Each second coil element 30B has a main part extending in the track width direction (the X direction). Each second coil element 30B and the lead layer 30C are made of a conductive material such as copper.

As shown in FIG. 4 and FIG. 5, the thermally-assisted magnetic recording head further includes a plurality of connection parts 38 and a single connection part 39. The plurality of connection parts 38 connect the plurality of first coil elements 30A to the plurality of second coil elements 30B so as to form a coil 30 wound helically around the yoke layer 34. The connection part 39 connects one of the first coil elements 30A to the lead layer 30C. The connection parts 38 and the connection part 39 are provided to penetrate through the insulating layers 32, 35 and 36. The connection parts 38 and the connection part 39 are each made of a conductive material such as copper.

The parts from the bottom shield layer 3 to the return pole layer 10 constitute a read head. The parts from the return pole layer 10 to the plurality of second coil elements 30B constitute a write head. The coil 30 is composed of the plurality of first coil elements 30A, the plurality of second coil elements 30B, and the plurality of connection parts 38. The coil 30 produces a magnetic field corresponding to data to be written on the recording medium. The shield layer 12, the return pole layer 10, the coupling layers 13 and 15, the coupling portions 17A and 17B, the coupling layers 24 and 27, the yoke layer 34, the coupling layer 26, and the main pole 23 form a magnetic path for passing a magnetic flux corresponding to the magnetic field produced by the coil 30. The main pole 23 allows the magnetic flux corresponding to the magnetic field produced by the coil 30 to pass, and produces a write magnetic field for writing data on the recording medium by means of a perpendicular magnetic recording system.

As has been described, the thermally-assisted magnetic recording head of the present embodiment includes the medium facing surface 40, the read head, and the write head. The medium facing surface 40 faces the recording medium. The read head and the write head are stacked on the substrate 1. Relative to the read head, the write head is located on the forward side (the trailing side) in the direction of travel of the recording medium (the Z direction).

The read head includes the MR element 5 serving as a read element, and the bottom shield layer 3 and a top shield layer for shielding the MR element 5. The bottom shield layer 3 and the top shield layer have their respective portions that are located near the medium facing surface 40 and opposed to each other with the MR element 5 therebetween. In the present embodiment, the return pole layer 10 of the write head also serves as the top shield layer of the read head. The read head further includes the bottom shield gap film 4 disposed between the MR element 5 and the bottom shield layer 3, and the top shield gap film 6 disposed between the MR element 5 and the return pole layer 10.

The write head includes the coil 30, the main pole 23, the waveguide, and the plasmon generator 22. The waveguide includes the core 19 and the cladding. The cladding includes the cladding layers 18, 20, and 21. The coil 30 produces a magnetic field corresponding to data to be written on the recording medium. The main pole 23 allows a magnetic flux corresponding to the magnetic field produced by the coil 30 to pass, and produces a write magnetic field for writing data on the recording medium by means of the perpendicular magnetic recording system.

The near-field light generator according to the present embodiment includes the waveguide including the core 19 and the cladding, and includes the plasmon generator 22. The core 19 has the top surface 19c and propagates laser light emitted from a not-shown laser diode. The cladding includes the cladding layer 21 having the groove 21b located above the top surface 19c of the core 19. The groove 21b has the two wall faces 21b1 and 21b2 that each form a constant or almost constant inclination angle θ from the opening to lower end of the groove 21b and that intersect at a predetermined angle 2θ. At least part of the plasmon generator 22 is located in the groove 21b.

Now, with reference to FIG. 1, an example of the shape of the plasmon generator 22 and the main pole 23 will be described in detail below. In the example shown in FIG. 1, the plasmon generator 22 has two slopes 22a and 22b, an edge part 22e, and a near-field light generating part 22g. The two slopes 22a and 22b are opposed to the two wall faces 21b1 and 21b2 of the groove 21b of the cladding layer 21. The edge part 22e is defined by the two slopes 22a and 22b intersecting each other. The near-field light generating part 22g lies at an end of the edge part 22e and generates near-field light. The edge part 22e faces the top surface 19c of the core 19 with a predetermined gap therebetween, and extends in the direction perpendicular to the medium facing surface 40 (the Y direction). The near-field light generating part 22g is located in the medium facing surface 40. The angle between the two slopes 22a and 22b is equal to the angle 2θ between the two wall faces 21b1 and 21b2 of the groove 21b.

The plasmon generator 22 further has a sidewall part 221A including the slope 22a, a sidewall part 221B including the slope 22b, and extended portions 222A and 222B that are coupled to the upper ends of the sidewall parts 221A and 221B, respectively. The sidewall parts 221A and 221B and the extended portions 222A and 222B are each plate-shaped. The sidewall part 221A is disposed along the wall face 21b1 of the groove 21b. The sidewall part 221B is disposed along the wall face 21b2 of the groove 21b. The extended portions 222A and 222B are disposed along the top surface 21a of the cladding layer 21. The extended portion 222A extends from the upper end of the sidewall part 221A in a direction away from both the sidewall parts 221A and 221B. The extended portion 222B extends from the upper end of the sidewall part 221B in a direction away from both the sidewall parts 221A and 221B.

The main pole 23 includes a first portion 231 and a second portion 232. The first portion 231 is accommodated in the space defined by the two sidewall parts 221A and 221B of the plasmon generator 22. The second portion 232 is located farther from the core 19 than is the first portion 231. In FIG. 1, the border between the first portion 231 and the second portion 232 is shown by chain double-dashed lines.

The shapes and the arrangement of the plasmon generator 22 and the main pole 23 are not limited to the foregoing example that has been described with reference to FIG. 1.

Now, the principle of generation of near-field light in the present embodiment and the principle of thermally-assisted magnetic recording using the near-field light will be described in detail. Laser light emitted from a not-shown laser diode is incident on the incidence part 19a of the core 19. As shown in FIG. 2, the laser light 50 propagates through the core 19 toward the medium facing surface 40, and reaches the vicinity of the plasmon generator 22. The laser light 50 is then totally reflected at the top surface 19c of the core 19. This causes evanescent light to occur from the top surface 19c to permeate into the cladding layer 21. As a result, surface plasmons are excited at least on the edge part 22e in the plasmon generator 22 through coupling with the evanescent light.

The surface plasmons excited on the plasmon generator 22 propagate along the edge part 22e to the near-field light generating part 22g. Consequently, the surface plasmons concentrate at the near-field light generating part 22g, and near-field light occurs from the near-field light generating part 22g based on the surface plasmons. The near-field light is projected toward the recording medium, reaches the surface of the recording medium and heats a part of the magnetic recording layer of the recording medium. This lowers the coercivity of the part of the magnetic recording layer. In thermally-assisted magnetic recording, the part of the magnetic recording layer with the lowered coercivity is subjected to a write magnetic field produced by the main pole 23 for data writing.

Now, with reference to FIG. 2 and FIG. 3, a description will be given of a method of manufacturing the thermally-assisted magnetic recording head of the present embodiment. The method of manufacturing the thermally-assisted magnetic recording head of the present embodiment includes the steps of; forming components of a plurality of thermally-assisted magnetic recording heads other than the substrates 1 on a substrate that includes portions to become the substrates 1 of the plurality of thermally-assisted magnetic recording heads, thereby fabricating a substructure that includes rows of a plurality of pre-head portions that are to later become the plurality of thermally-assisted magnetic recording heads; and forming the plurality of thermally-assisted magnetic recording heads by cutting the substructure to separate the plurality of pre-head portions from each other. In the step of forming the plurality of thermally-assisted magnetic recording heads, the cut surfaces are polished into the medium facing surfaces 40.

The method of manufacturing the thermally-assisted magnetic recording head of the present embodiment will now be described in more detail with attention focused on a single thermally-assisted magnetic recording head. In the method of manufacturing the thermally-assisted magnetic recording head of the present embodiment, the insulating layer 2 is formed on the substrate 1 first. Next, the bottom shield layer 3 is formed on the insulating layer 2. The bottom shield gap film 4 is then formed on the bottom shield layer 3. Next, the MR element 5 and not-shown two leads connected to the MR element 5 are formed on the bottom shield gap film 4. The top shield gap film 6 is then formed to cover the MR element 5 and the leads.

Next, the return pole layer 10 is formed on the top shield gap film 6. Next, a not-shown insulating layer is formed to cover the return pole layer 10. The not-shown insulating layer is then polished by, for example, chemical mechanical polishing (hereinafter referred to as CMP), until the return pole layer 10 is exposed. Then, the insulating layer 11 is formed on part of the top surface of the return pole layer 10.

Next, the shield layer 12 and the coupling layer 13 are formed on the return pole layer 10. Next, the insulating layer 14 is formed to cover the shield layer 12 and the coupling layer 13. The insulating layer 14 is then polished by, for example, CMP, until the shield layer 12 and the coupling layer 13 are exposed.

Next, the coupling layer 15 is formed on the coupling layer 13. Next, the insulating layer 16 is formed to cover the coupling layer 15. The insulating layer 16 is then polished by, for example, CMP, until the coupling layer 15 is exposed. The top surfaces of the coupling layer 15 and the insulating layer 16 are thereby made even with each other.

Next, the first layers of the coupling portions 17A and 17B are formed on the coupling layer 15. The cladding layer 18 is then formed to cover the first layers of the coupling portions 17A and 17B. The cladding layer 18 is then polished by, for example, CMP, until the first layers of the coupling portions 17A and 17B are exposed.

Next, the core 19 is formed on the cladding layer 18. The second layers of the coupling portions 17A and 17B are formed on the first layers of the coupling portions 17A and 17B. The cladding layer 20 is then formed to cover the core 19 and the second layers of the coupling portions 17A and 17B. The cladding layer 20 is then polished by, for example, CMP, until the core 19 and the second layers of the coupling portions 17A and 17B are exposed.

Next, the third layers of the coupling portions 17A and 17B are formed on the second layers of the coupling portions 17A and 17B. The cladding layer 21, the plasmon generator 22, and the main pole 23 are then formed in this order. The plasmon generator 22 is formed by initially forming a metal film by, for example, sputtering, and then patterning the metal film. The main pole 23 is formed by plating, for example. The step of forming the cladding layer 21 will be described in detail later.

Next, the coupling layer 24 is formed over the third layers of the coupling portions 17A and 17B. Next, the insulating layer 25 is formed to cover the main pole 23 and the coupling layer 24. The insulating layer 25 is then polished by, for example, CMP, until the main pole 23 and the coupling layer 24 are exposed.

Next, the insulating layer 28 is formed over the main pole 23, the coupling layer 24, and the insulating layer 25. The plurality of first coil elements 30A are then formed on the insulating layer 28. Next, the insulating layer 31 is formed around the first coil elements 30A. The insulating layer 32 is then formed to cover the plurality of first coil elements 30A and the insulating layer 31. Next, the insulating layers 28, 31 and 32 are selectively etched to form therein openings for exposing the top surface of the main pole 23 and openings for exposing the top surface of the coupling layer 24. Then, the coupling layer 26 is formed on the main pole 23, and the coupling layer 27 is formed on the coupling layer 24. Next, the insulating layer 33 is formed to cover the coupling layers 26 and 27. The insulating layer 33 is then polished by, for example, CMP, until the coupling layers 26 and 27 are exposed.

Next, the insulating layer 32 is selectively etched to form therein a plurality of openings for passing portions of the connection parts 38 and 39. The connection parts 38 and 39 are then formed to be connected to the plurality of first coil elements 30A through the plurality of openings. The yoke layer 34 is formed over the coupling layers 26 and 27 and the insulating layer 32. Next, the insulating layer 35 is formed to cover the yoke layer 34 and the connection parts 38 and 39. The insulating layer 35 is then polished by, for example, CMP, until the yoke layer 34 and the connection parts 38 and 39 are exposed. Next, the insulating layer 36 is formed over the yoke layer 34, the insulating layer 35, and the connection parts 38 and 39.

Next, the insulating layer 36 is selectively etched to form therein a plurality of openings for exposing the top surfaces of the connection parts 38 and 39. The plurality of second coil elements 30B and the lead layer 30C are then formed on the insulating layer 36 and the connection parts 38 and 39. Next, the protective layer 37 is formed to cover the plurality of second coil elements 30B and the lead layer 30C. Wiring, terminals, and other components are then formed on the top surface of the protective layer 37.

When the substructure is completed thus, the substructure is cut to separate the plurality of pre-head portions from each other, and then polishing of the medium facing surface 40, fabrication of flying rails, and other processing are performed to complete the thermally-assisted magnetic recording head.

Now, the method of manufacturing the near-field light generator according to the present embodiment will be described. The method of manufacturing the near-field light generator according to the present embodiment includes the steps of; forming the core 19; forming the cladding; and forming the plasmon generator 22. The step of forming the cladding includes the steps of; forming the cladding layer 18; forming the cladding layer 20; and forming the cladding layer 21.

Reference is now made to FIG. 6 to FIG. 11 to describe the step of forming the cladding layer 21. In the present embodiment, the cladding layer 21 is formed of alumina. The following includes the description of the taper-etching method according to the present embodiment. FIG. 6 to FIG. 11 each show a cross section of a stack of layers formed in the process of manufacturing the near-field light generator, the cross section being taken in the position where the medium facing surface 40 is to be formed.

Figure 6:
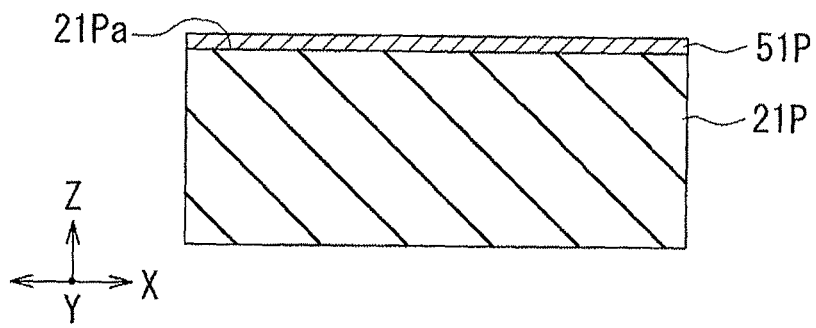
FIG. 6 is a cross-sectional view showing a step of a method of manufacturing a near-field light generator according to the first embodiment of the invention.

FIG. 6 shows a step that follows the formation of the third layers of the coupling portions 17A and 17B. In this step, a layer to be etched 21P is formed first. The layer to be etched 21P is made of a dielectric material. The layer to be etched 21P is formed by initially forming a dielectric material layer to cover the top surface 19c of the core 19, the top surface of the cladding layer 20 and the third layers of the coupling portions 17A and 17B, and then polishing the dielectric material layer by, for example, CMP, until the third layers of the coupling portions 17A and 17B are exposed. The groove 21b, which is V-shaped in cross section parallel to the medium facing surface 40, is to be formed later in the layer to be etched 21P. The layer to be etched 21P becomes the cladding layer 21 when the groove 21b is formed. The layer to be etched 21P has a top surface 21Pa. In the present embodiment, the dielectric material to form the layer to be etched 21P (the dielectric material layer) is alumina, in particular. On the top surface 21Pa of the layer to be etched 21P, an etching mask material layer 51P of Ta is then formed. The etching mask material layer 51P has a thickness in the range of 2 to 60 nm, for example.

Figure 7:
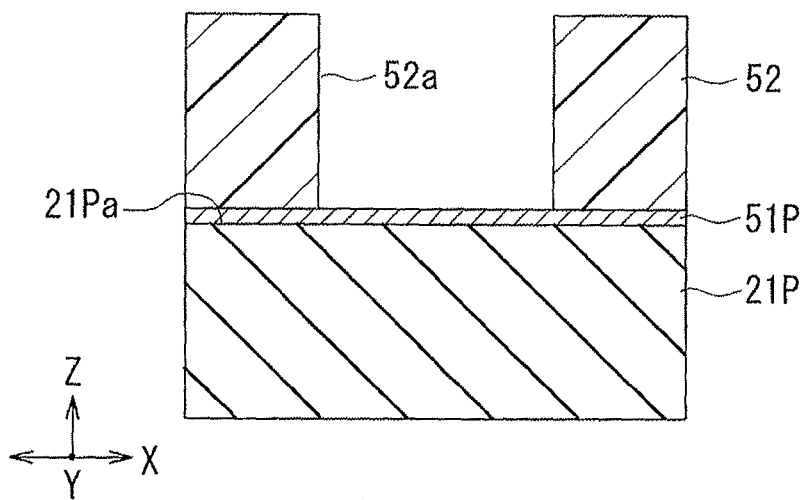
FIG. 7 is a cross-sectional view showing a step that follows the step shown in FIG. 6.

FIG. 7 shows the next step. In this step, an etching mask 52 is formed on the top surface of the etching mask material layer 51P. The etching mask 52 has an opening 52a having a shape corresponding to the planar shape of the groove 21b to be formed later. The etching mask 52 is formed by patterning a photoresist layer by photolithography. The minimum width (critical dimension) of the opening 52a is the width in the X direction, and falls within the range of 0.15 to 0.5 µm, for example. The thicker the etching mask 52, the less controllable the minimum width of the opening 52a becomes. Thus, the thickness of the etching mask 52 is preferably reduced to some extent. The etching selectivity of the etching mask 52 relative to the layer to be etched 21P made of alumina is, for example, 0.5 or less. Accordingly, taking into account the depth H of the groove 21b to be formed in the layer to be etched 21P, the thickness of the etching mask 52 is preferably 0.6 µm or greater. By way of example, where the minimum width of the opening 52a is within the range of 0.2 to 0.3 µm, the thickness of the etching mask 52 is 1 µm. However, the thickness of the etching mask 52 need not always be 1 µm.

Next, a portion of the etching mask material layer 51P that is exposed from the opening 52a is etched by, for example, reactive ion etching (hereinafter referred to as RIE) using the etching mask 52. This provides the etching mask material layer 51P with an opening 51a having a shape corresponding to the planar shape of the groove 21b to be formed later. The etching mask material layer 51P thereby becomes an etching mask 51. In the present embodiment, the etching masks 51 and 52 correspond to the etching mask according to the invention.

Next, the groove 21b is formed in the layer to be etched 21P so that the layer to be etched 21P becomes the cladding layer 21. In the step of forming the groove 21b, a portion of the layer to be etched 21P that is exposed from the opening 51a of the etching mask 51 and the opening 52a of the etching mask 52 is taper-etched by RIE using the etching masks 51 and 52. The etching masks 51 and 52 are then removed.

The step of taper-etching the layer to be etched 21P by RIE employs an etching gas containing a first gas that contributes to the etching of the layer to be etched 21P and a second gas that contributes to the deposition of a sidewall protective film. The first gas may contain $Cl_2$ and $BCl_3$. The second gas may contain at least one of $N_2$ and $CF_4$.

Where the second gas contains $N_2$, elemental Al contained in the layer to be etched 21P made of alumina and elemental N contained in the etching gas produce a reaction product AlN during the etching of the layer to be etched 21P. Where the second gas contains CF4, elemental Al contained in the layer to be etched 21P made of alumina and elemental F contained in the etching gas produce a reaction product AlF during the etching of the layer to be etched 21P. Such a reaction product adheres to the sidewalls of the groove formed in the layer to be etched 21P to form a sidewall protective film. The sidewall protective film made of the reaction product is deposited on the sidewalls of the groove being formed by the etching, and the groove 21b is thereby formed.

In the step of taper-etching the layer to be etched 21P by RIE, each of the two wall faces 21b1 and 21b2 of the groove 21b is formed to be inclined at an inclination angle θ with respect to the direction perpendicular to the top surface 21Pa of the layer to be etched 21P (the top surface 21a of the cladding layer 21). In this manner, there is formed the groove 21b which is V-shaped in cross section parallel to the medium facing surface 40 and has the two wall faces 21b1 and 21b2 intersecting at a predetermined angle 2θ. The groove 21b is formed not to reach the top surface 19c of the core 19. The layer to be etched 21P becomes the cladding layer 21 when the groove 21b is formed.

The inclination angle θ depends on the ratio of the deposition rate of the sidewall protective film to the etching rate of the layer to be etched 21P. In the present embodiment, the ratio of the flow rate of the second gas to the flow rate of the first gas is controlled in the step of taper-etching the layer to be etched 21P by RIE, so that the inclination angle θ of each of the two wall faces 21b1 and 21b2 will be constant or almost constant from the opening to lower end of the groove 21b. More specifically, the ratio of the flow rate of the second gas to the flow rate of the first gas is changed during this step so that the ratio increases. This ratio may be increased in a stepwise or stepless manner. The control of the ratio is accomplished by changing at least one of the flow rate of the first gas and the flow rate of the second gas.

Figure 8:
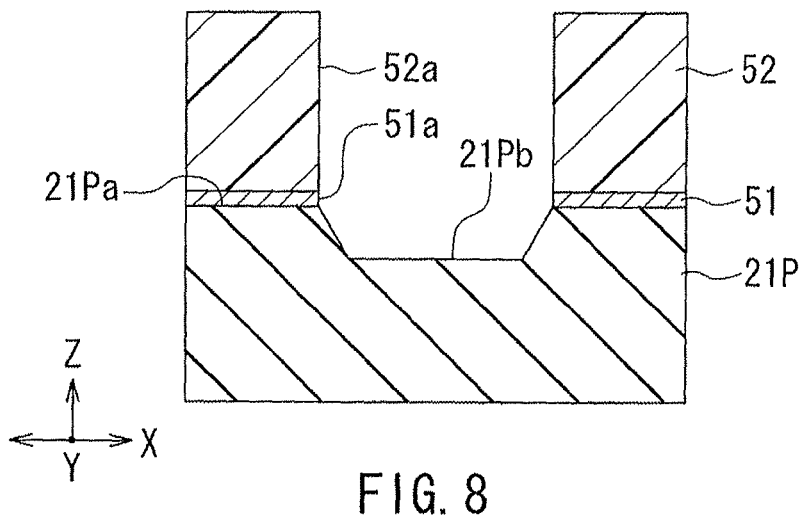
FIG. 8 is a cross-sectional view showing a step that follows the step shown in FIG. 7.
Figure 9:
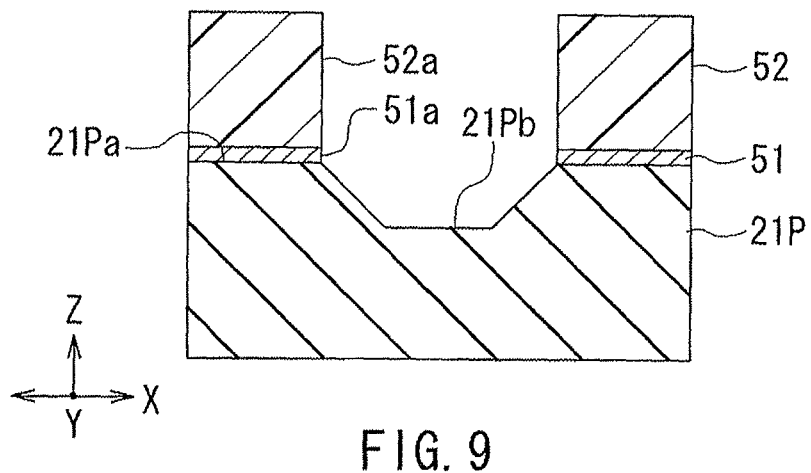
FIG. 9 is a cross-sectional view showing a step that follows the step shown in FIG. 8.
Figure 10:
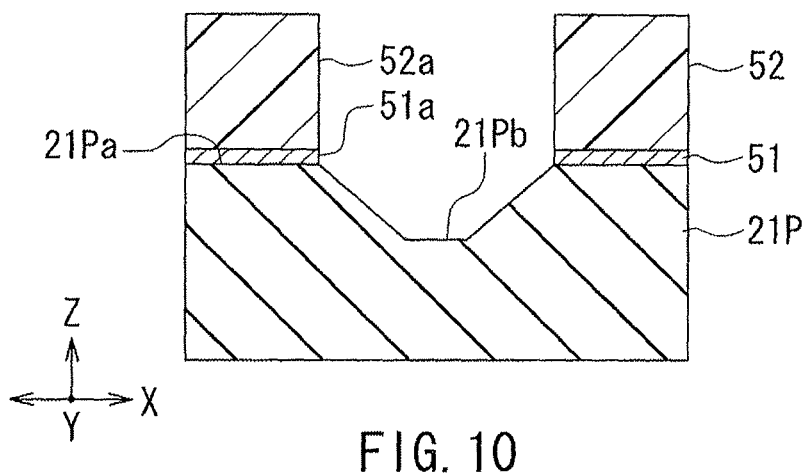
FIG. 10 is a cross-sectional view showing a step that follows the step shown in FIG. 9.
Figure 11:
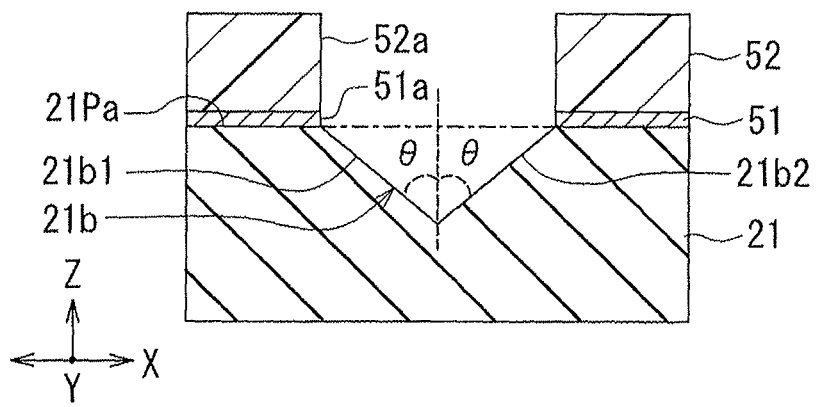
FIG. 11 is a cross-sectional view showing a step that follows the step shown in FIG. 10.

Reference is now made to FIG. 8 to FIG. 11 to describe an example where the inclination angle θ of each of the wall faces 21b1 and 21b2 of the groove 21b is made to be 45° so that the angle 2θ is 90°. In this example, the step of taper-etching the layer to be etched 21P by RIE includes first to fourth steps that employ mutually different ratios of the flow rate of the second gas to the flow rate of the first gas. The first step lasts for a predetermined duration from the start of etching of the layer to be etched 21P. The second step lasts for a predetermined duration after the first step. The third step lasts for a predetermined duration after the second step. The fourth step lasts for a predetermined duration after the third step and is the final step in the etching of the layer to be etched 21P. FIG. 8 shows the groove after the first step. FIG. 9 shows the groove after the second step. FIG. 10 shows the groove after the third step. FIG. 11 shows the groove after the fourth step, that is, the groove 21b.

In this example, the first gas contains $Cl_2$ and $BCl_3$ and the second gas contains at least one of $N_2$ and $CF_4$. Now, a description will be given of a first example and a second example of the method for controlling the ratio of the flow rate of the second gas to the flow rate of the first gas. The first example changes the flow rate of $N_2$ whereas second example changes the flow rate of $CF_4$. The first example will be described first. In the first example, the flow rates of $Cl_2$, $BCl_3$, and $CF_4$ are set to 15 sccm, 60 sccm, and 9 sccm, respectively. Furthermore, the flow rate of $N_2$ is increased in a stepwise manner so as to be 5 sccm in the first step, 11 sccm in the second step, 15 sccm in the third step, and 20 sccm in the fourth step. In this manner, the ratio of the flow rate of the second gas to the flow rate of the first gas is increased stepwise.

In the first step, as shown in FIG. 8, the portion of the layer to be etched 21P that is exposed from the openings 51a and 52a of the etching masks 51 and 52 is etched to form a groove 21Pb in the layer to be etched 21P. The groove 21Pb has two sidewalls each inclined at a predetermined inclination angle, and a bottom which connects the two sidewalls to each other. In the second to the fourth steps, as shown in FIG. 9 to FIG. 11, etching proceeds in the layer to be etched 21P to gradually increase the depth of the groove 21Pb and gradually decrease the distance between the two sidewalls at the bottom of the groove 21Pb. As a result of the fourth step, the two sidewalls of the groove 21Pb meets each other at the bottom of the groove 21Pb to form the groove 21b having the wall faces 21b1 and 21b2 which are inclined at 45° from the opening to lower end of the groove 21b.

The second example will now be described. In the second example, the flow rates of $Cl_2$, $BCl_3$, and $N_2$ are set to 15 sccm, 60 sccm, and 0 sccm, respectively. Furthermore, the flow rate of $CF_4$ is increased in a stepwise manner so as to be 11 sccm in the first step, 14 sccm in the second step, 17 sccm in the third step, and 25 sccm in the fourth step. In this manner, the ratio of the flow rate of the second gas to the flow rate of the first gas is increased stepwise. In the second example, as in the first example, etching proceeds in the layer to be etched 21P as shown in FIG. 8 to FIG. 11 so that the groove 21b is finally formed to have the wall faces 21b1 and 21b2 which are inclined at 45° from the opening to lower end of the groove 21b.

Possible methods for controlling the ratio of the flow rate of the second gas to the flow rate of the first gas are not limited to the aforementioned first and second examples. For example, to increase the ratio of the flow rate of the second gas to the flow rate of the first gas in a stepwise manner, the step of taper-etching the layer to be etched 21P by RIE may include two, three, or five or more steps that employ mutually different ratios of the flow rate of the second gas to the flow rate of the first gas. On the other hand, to increase the ratio of the flow rate of the second gas to the flow rate of the first gas in a stepless manner, the step of taper-etching the layer to be etched 21P by RIE may steplessly decrease the flow rate of the first gas or steplessly increase the flow rate of the second gas. For example, in the aforementioned first example, the flow rate of $N_2$ may be steplessly increased from 5 sccm to 20 sccm.

As has been described, the step of forming the cladding layer 21 in the method of manufacturing the near-field light generator according to the present embodiment and the taper-etching method according to the present embodiment include the steps of: forming the layer to be etched 21P that is made of a dielectric material and has the top surface 21Pa; forming the etching masks 51 and 52 having the openings 51a and 52a on the top surface 21Pa of the layer to be etched 21P; and taper-etching the portion of the layer to be etched 21P that is exposed from the openings 51a and 52a, by RIE to form the groove 21b in the layer to be etched 21P so that the layer to be etched 21P becomes the cladding layer 21.

The step of taper-etching the layer to be etched 21P by RIE employs an etching gas containing a first gas contributing to the etching of the layer to be etched 21P and a second gas contributing to the deposition of the sidewall protective film, and changes, during the step, the ratio of the flow rate of the second gas to the flow rate of the first gas so that the ratio increases. As the etching proceeds in the layer to be etched 21P, the depth of the groove 21Pb being etched increases and the distance between the two sidewalls at the bottom of the groove decreases. In this situation, according to the present embodiment, it is possible that in a region near the bottom of the groove the advancement of the etching can be retarded and the formation of the sidewall protective film can be accelerated so as to prevent the etching from becoming predominant over the deposition of the sidewall protective film. The present embodiment thus makes it possible to form, in the layer to be etched 21P made of a dielectric material, the groove 21b having the two wall faces 21b1 and 21b2 that each form a constant or almost constant inclination angle θ from the opening to lower end of the groove 21b and that intersect at a predetermined angle 2θ. In particular, the present embodiment allows the groove 21b to be formed such that the inclination angle θ of each of the two wall faces 21b1 and 21b2 falls within the range of 25° to 60°, and consequently the angle 2θ falls within the range of 50° to 120°. Note that the reason why each of the two wall faces 21b1 and 21b2 forms a constant or almost constant inclination angle θ from the opening to lower end of the groove 21b will be described in detail later.

The angle between the two slopes 22a and 22b of the plasmon generator 22 affects the intensity of surface plasmons excited on the plasmon generator 22 and the spot diameter of near-field light generated from the near-field light generating part 22g. In order to increase to some extent the intensity of surface plasmons excited on the plasmon generator 22 and to decrease to some extent the spot diameter of near-field light generated from the near-field light generating part 22g, the angle between the two slopes 22a and 22b preferably falls within the range of 50° to 120°.

Since the present embodiment allows the groove 21b of the cladding layer 21 to be formed as described above, it is possible to form the sidewall parts 221A and 221B of the plasmon generator 22 in the groove 21b such that the angle between the two slopes 22a and 22b falls within the range of 50° to 120°. Consequently, it is possible to provide a near-field light generator configured so that the sidewall parts 221A and 221B of the plasmon generator 22 are located in the groove 21b of the cladding layer 21 and the angle between the two slopes 22a and 22b falls within the desired range of 50° to 120°.

Figure 12:
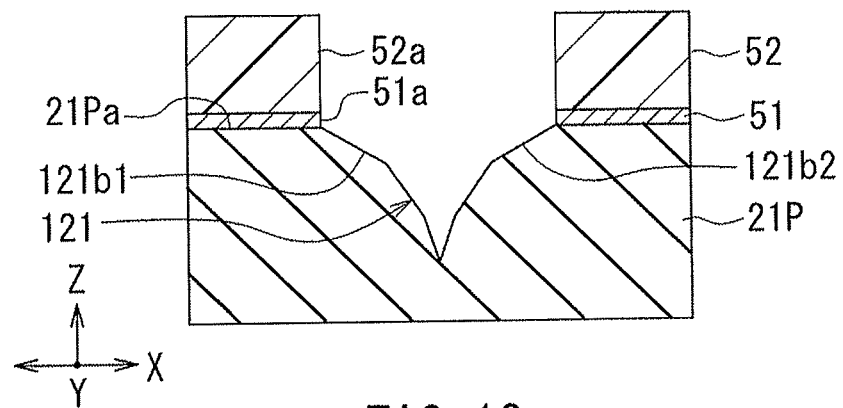
FIG. 12 is a cross-sectional view showing a step of an etching method of a comparative example.

The effects of the present embodiment will now be described in comparison with an etching method of a comparative example. First, the etching method of the comparative example will be described with reference to FIG. 12. FIG. 12 is a cross-sectional view showing a step of the etching method of the comparative example. FIG. 12 shows a cross section of a stack of layers formed in the process of manufacturing a near-field light generator, the cross section being taken in the position where the medium facing surface 40 is to be formed. In the etching method of the comparative example, the taper-etching of the layer to be etched 21P by RIE is performed at a constant ratio of the flow rate of the second gas to the flow rate of the first gas in the etching gas. By etching the layer to be etched 21P under such a condition, a groove 121 having two wall faces 121b1 and 121b2 is formed in the layer 21P. As shown in FIG. 12, the inclination angle of each of the wall faces 121b1 and 121b2 decreases with increasing proximity to the lower end of the groove 121.

Figure 13:
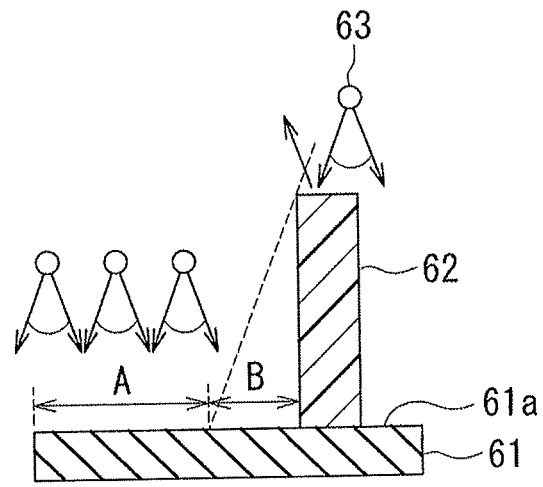
FIG. 13 is an explanatory diagram illustrating an etching by reactive ion etching.

Reference is now made to FIG. 13 to describe the reason why the etching method of the comparative example results in the formation of the groove 121 having the wall faces 121b1 and 121b2 whose inclination angle decreases with increasing proximity to the lower end of the groove 121 as mentioned above. FIG. 13 is an explanatory diagram illustrating an etching by RIE. In FIG. 13, the numeral 61 represents a layer to be etched, the numeral 62 represents a photoresist mask, and the numeral 63 represents ions. The ions 63 travel through a plasma in directions that are varied to some extent with respect to a direction perpendicular to the top surface 61a of the layer to be etched 61. Consequently, there will occur what is called a shadow region B in the top surface 61a of the layer to be etched 61 in the vicinity of the photoresist mask 62. The shadow region B is a region that the ions 63 are less likely to reach due to the presence of the photoresist mask 62. As a result, a relatively larger amount of ions 63 reach a region A, which is a region in the top surface 61a of the layer to be etched 61 that is located away from the photoresist mask 62, as compared with the amount of ions 63 that reach the region B. In the region A, a greater amount of deposited reaction products are hit by the ions 63 to leave therefrom than in the region B. As a result, in the region A, when compared with the region B, etching becomes predominant over the deposition of the sidewall protective film. Accordingly, the inclination angle of the sidewalls of the groove formed in the region A becomes smaller than the inclination angle of the sidewalls of the groove formed in the region B. As etching proceeds, the height of the photoresist mask 62 decreases. As a result, the region B becomes smaller, whereas the region A becomes larger. For this reason, the phenomenon that the inclination angle of the sidewalls of the groove differs depending on the region is more noticeable when the photoresist mask 62 has a greater height.

As etching proceeds, the depth of the groove being etched gradually increases and the distance between the two sidewalls at the bottom of the groove gradually decreases. The principle that has been described with reference to FIG. 13 holds also true for etching in a region near the bottom of the groove. That is, when viewed from a region near the bottom of the groove, the increase in depth of the groove and the decrease in distance between the two sidewalls at the bottom of the groove is equivalent to an increase in height of the sidewalls, that is, an increase in height of the photoresist mask 62 in FIG. 13. Accordingly, in the region near the bottom of the groove being etched, the etching becomes predominant over the deposition of the sidewall protective film as the depth of the groove increases and the distance between the two sidewalls at the bottom of the groove decreases. As a result, as shown in FIG. 12, there is formed the groove 121 having the wall faces 121b1 and 121b2 whose inclination angle decreases with increasing proximity to the lower end of the groove 121. Thus, the etching method of the comparative example cannot make the groove 121 into a V-shape such that the two wall faces each form a constant or almost constant inclination angle from the opening to lower end of the groove 121.

In contrast to this, according to the present embodiment, the step of taper-etching the layer to be etched 21P by RIE changes the ratio of the flow rate of the second gas contributing to the deposition of the sidewall protective film to the flow rate of the first gas contributing to the etching of the layer to be etched 21P during the step so that the ratio increases. Thus, when the depth of the groove 21Pb being etched increases and the distance between the two sidewalls at the bottom of the groove 21Pb decreases as the etching proceeds in the layer to be etched 21P, it is possible that in a region near the bottom of the groove the advancement of the etching can be retarded and the formation of the sidewall protective film can be accelerated so as to prevent the etching from becoming predominant over the deposition of the sidewall protective film. Consequently, according to the present embodiment, it is possible to make the inclination angle $\theta$ of each of the two wall faces 21b1 and 21b2 be constant or almost constant from the opening to lower end of the groove 21b.

Second Embodiment

A second embodiment of the invention will now be described. In the thermally-assisted magnetic recording head of the second embodiment, the cladding layer 21 is made of $SiO_2$ or SiON. The remainder of configuration of the thermally-assisted magnetic recording head of the present embodiment is the same as that of the first embodiment.

Now, the method of manufacturing the near-field light generator according to the present embodiment will be described. The step of forming the cladding layer 21 of the present embodiment is different from that of the first embodiment. Reference is now made to FIG. 14 to FIG. 18 to describe the step of forming the cladding layer 21 of the present embodiment in detail. The following includes the description of the taper-etching method according to the present embodiment. FIG. 14 to FIG. 18 each show a cross section of a stack of layers formed in the process of manufacturing the near-field light generator, the cross section being taken in the position where the medium facing surface 40 is to be formed.

Figure 14:
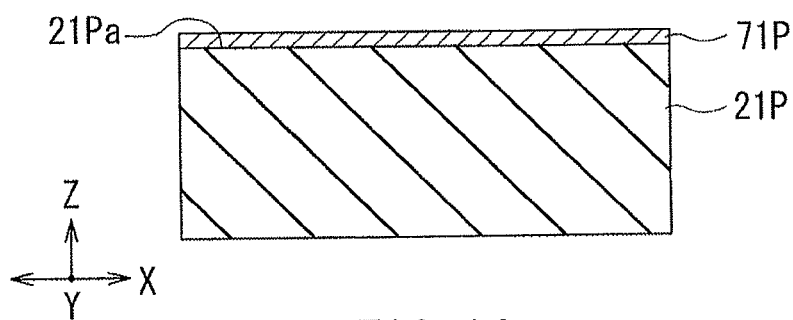
FIG. 14 is a cross-sectional view showing a step of a method of manufacturing a near-field light generator according to a second embodiment of the invention.

FIG. 14 shows a step that follows the formation of the third layers of the coupling portions 17A and 17B of the first embodiment shown in FIG. 2. In this step, first formed is a layer to be etched 21P that is made of $SiO_2$ or SiON. Next, a stopper film 71P of Ru is formed on the top surface 21Pa of the layer to be etched 21P. Note that any of magnetic materials, Ni, NiCr, C, MgF, and MgO may be employed instead of Ru.

Figure 15:
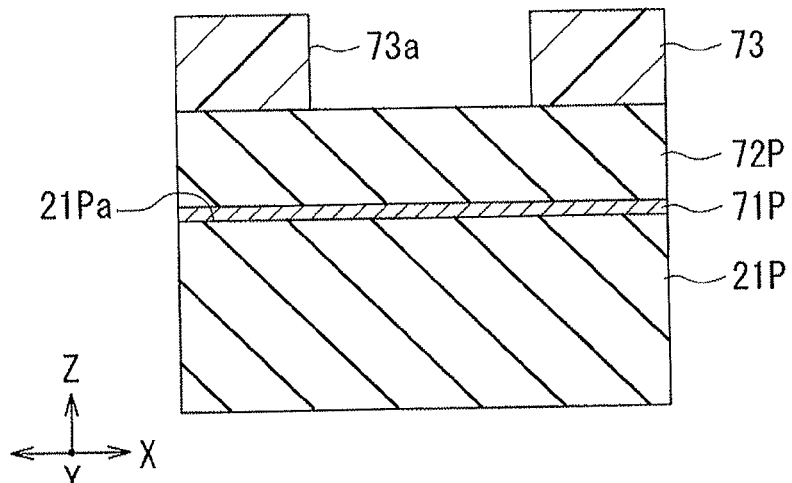
FIG. 15 is a cross-sectional view showing a step that follows the step shown in FIG. 14.

FIG. 15 shows the next step. In this step, first, an etching mask material layer 72P is formed on the top surface of the stopper film 71P. The etching mask material layer 72P is formed of a material containing elemental Al. The material used to form the etching mask material layer 72P may contain at least one of an Al-containing alloy, alumina ($Al_2O_3$), aluminum nitride (AlN), and aluminum fluoride (AlF), for example. Where alumina is employed as the material of the etching mask material layer 72P, the etching mask material layer 72P is formed to have a thickness in the range of 0.05 to 0.3 µm, for example.

Next, a photoresist mask 73 is formed on the top surface of the etching mask material layer 72P. The photoresist mask 73 has an opening 73a that has a shape corresponding to the planar shape of the groove 21b to be formed later. The photoresist mask 73 is formed by patterning a photoresist layer by photolithography.

Figure 16:
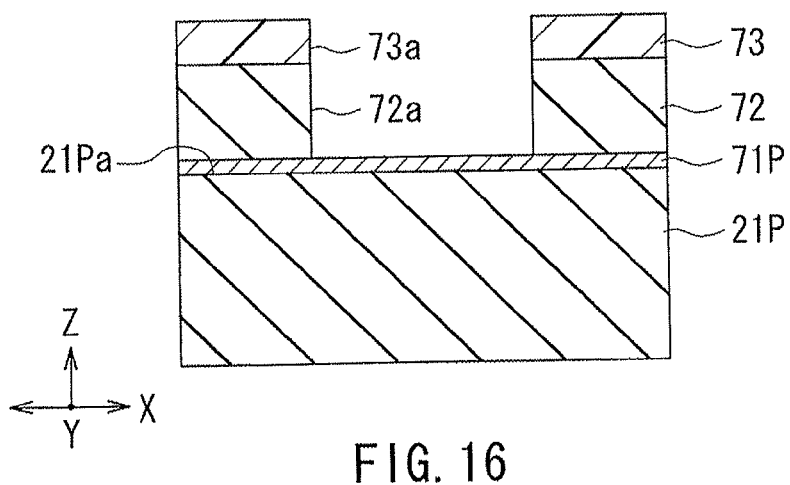
FIG. 16 is a cross-sectional view showing a step that follows the step shown in FIG. 15.

FIG. 16 shows the next step. In this step, a portion of the etching mask material layer 72P that is exposed from the opening 73a is etched by RIE using the photoresist mask 73 as the etching mask. This provides the etching mask material layer 72P with an opening 72a having a shape corresponding to the planar shape of the groove 21b to be formed later. The etching mask material layer 72P thereby becomes an etching mask 72.

Where the etching mask material layer 72P is made of alumina, a gas containing $Cl_2$ and $BCl_3$, for example, is used as the etching gas when the etching mask material layer 72P is etched by RIE. The stopper film 71P functions as the etching stopper that stops etching when the etching mask material layer 72P is etched by RIE.

The minimum width (critical dimension) of the opening 72a is the width in the X direction, and falls within the range of 0.15 to 0.5 µm, for example. Where the etching mask material layer 72P is made of alumina, the thicker the etching mask material layer 72P, the less controllable the minimum width of the opening 72a becomes. It is therefore preferable that the thickness of the etching mask material layer 72P be 0.3 µm or less. However, the thickness of the etching mask material layer 72P need not always be 0.3 µm or less.

Where the etching mask material layer 72P is made of alumina and has a thickness of 0.1 µm or less, ion beam etching (hereinafter referred to as IBE) may be employed to etch the etching mask material layer 72P to form the opening 72a therein.

Figure 17:
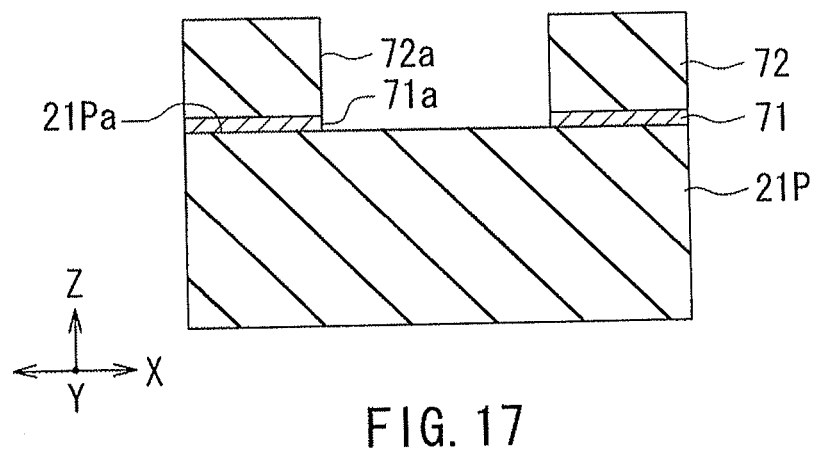
FIG. 17 is a cross-sectional view showing a step that follows the step shown in FIG. 16.

FIG. 17 shows the next step. In this step, first, a portion of the stopper film 71P that is exposed from the openings 72a and 73a is etched away by, for example, IBE or RIE using the etching mask 72 and the photoresist mask 73 as the etching mask. This provides the stopper film 71P with an opening 71a having a shape corresponding to the planar shape of the groove 21b to be formed later. The stopper film 71P thereby becomes an etching mask 71. Next, the photoresist mask 73 is removed by wet etching or ashing. In the present embodiment, the etching masks 71 and 72 correspond to the etching mask according to the invention.

Where the stopper film 71P is made of Ru, a gas containing $O_2$ and $Cl_2$, for example, is used as the etching gas when the stopper film 71P is etched by RIE. Where the etching mask material layer 72P is made of alumina and has a thickness of 0.1 µm or less, the stopper film 71P may be etched by IBE simultaneously with the etching of the etching mask material layer 72P.

Figure 18:
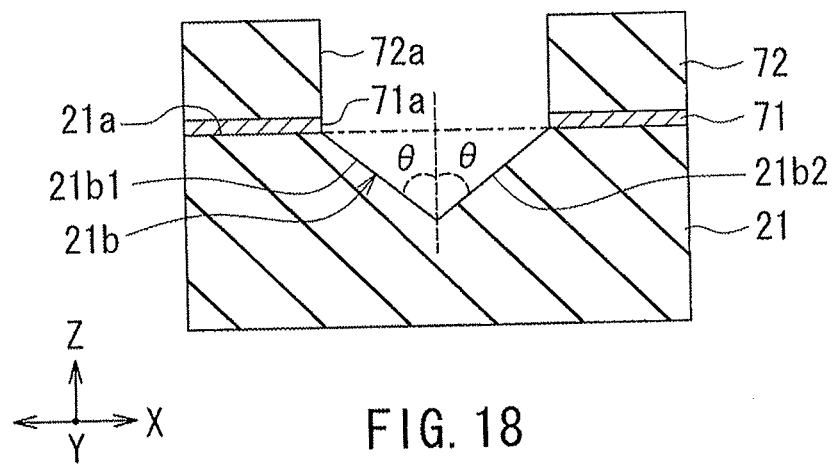
FIG. 18 is a cross-sectional view showing a step that follows the step shown in FIG. 17.

FIG. 18 shows the next step. In this step, first, the groove 21b is formed in the layer to be etched 21P so that the layer to be etched 21P becomes the cladding layer 21. In the step of forming the groove 21b, a portion of the layer to be etched 21P that is exposed from the openings 71a and 72a is taper-etched by RIE using the etching masks 71 and 72. The etching masks 71 and 72 are then removed.

The step of taper-etching the layer to be etched 21P by RIE employs an etching gas containing a first gas and a second gas, the first gas contributing to the etching of the layer to be etched 21P. In the present embodiment, since the etching mask 72 is formed of a material containing elemental Al, the entire etching mask consisting of the etching masks 71 and 72 inevitably contains elemental Al. The second gas contains $N_2$. In this case, a sidewall protective film is formed in the following manner. Part of the etching mask 72 is etched along with the layer to be etched 21P. Consequently, during the etching of the layer to be etched 21P, elemental Al contained in the etching mask 72 and elemental N contained in the etching gas produce a reaction product AlN. The reaction product AlN adheres to the sidewalls of the groove formed in the layer to be etched 21P to form the sidewall protective film. The sidewall protective film made of the reaction product AlN is deposited on the sidewalls of the groove being formed by the etching, and the groove 21b is thereby formed.

In the present embodiment, as in the first embodiment, the step of taper-etching the layer to be etched 21P by RIE changes the ratio of the flow rate of the second gas to the flow rate of the first gas during the step so that the ratio increases. As such, according to the present embodiment, it is possible to form the cladding layer 21 by forming, in the layer to be etched 21P made of $SiO_2$ or SiON, the groove 21b having the two wall faces 21b1 and 21b2 that each form a constant or almost constant inclination angle θ from the opening to lower end of the groove 21b and that intersect at a predetermined angle 2θ.

Here, a description will be given of a case where the inclination angle θ of each of the wall faces 21b1 and 21b2 is set to 45° so that the angle 2θ is 90° in the example shown in FIG. 18. In this example, the first gas contains $Cl_2$ and $BCl_3$, while the second gas contains $N_2$. The flow rates of $Cl_2$ and $BCl_3$ are set to 15 sccm and 60 sccm, respectively. Furthermore, the flow rate of $N_2$ is increased in a stepwise manner so as to be 9 sccm in the first step, 12 sccm in the second step, 14 sccm in the third step, and 16 sccm in the fourth step. In this manner, the ratio of the flow rate of the second gas to the flow rate of the first gas is increased stepwise. In this example, as in the first example of the first embodiment, etching proceeds in the layer to be etched 21P as shown in FIG. 8 to FIG. 11 so that the groove 21b is finally formed to have the wall faces 21b1 and 21b2 which are inclined at 45° from the opening to lower end of the groove 21b.

The remainder of configuration, function and effects of the present embodiment are similar to those of the first embodiment.

The present invention is not limited to the foregoing embodiments, and various modifications may be made thereto. For example, the taper-etching method of the present invention is applicable not only to the case of forming the groove 21b in the cladding layer 21 to accommodate at least part of the plasmon generator 22 as in the method of manufacturing the near-field light generator of the invention, but to all cases where taper-etching is to be performed on a dielectric layer to be etched.

It is apparent that the present invention can be carried out in various forms and modifications in the light of the foregoing descriptions. Accordingly, within the scope of the following claims and equivalents thereof, the present invention can be carried out in forms other than the foregoing most preferable embodiments.

What is claimed is:

1. A taper-etching method for taper-etching a layer to be etched, the layer to be etched being made of a dielectric material and having a top surface, the taper-etching method comprising the steps of:

forming an etching mask on the top surface of the layer to be etched, the etching mask having an opening; and taper-etching a portion of the layer to be etched, the portion being exposed from the opening, by reactive ion etching so that a groove having two wall faces that intersect at a predetermined angle is formed in the layer to be etched, wherein:
the step of taper-etching employs an etching gas containing a first gas contributing to the etching of the layer to be etched and a second gas contributing to deposition of a sidewall protective film, and changes, during the step, a ratio of a flow rate of the second gas to a flow rate of the first gas so that the ratio increases;
the layer to be etched is made of $SiO_2$ or SiON;
the etching mask contains elemental Al; and
the second gas contains $N_2$.

2. The taper-etching method according to claim 1, wherein the step of taper-etching increases the ratio of the flow rate of the second gas to the flow rate of the first gas in a stepwise manner.

3. The taper-etching method according to claim 1, wherein the step of taper-etching increases the ratio of the flow rate of the second gas to the flow rate of the first gas in a stepless manner.

4. The taper-etching method according to claim 1, wherein the first gas contains $Cl_2$ and $BCl_3$.

5. A method of manufacturing a near-field light generator, the near-field light generator comprising a waveguide and a plasmon generator, wherein:
the waveguide includes a core through which light propagates, and a cladding that surrounds the core;
the core has a top surface;
the cladding includes a cladding layer that has a groove located above the top surface of the core;
the groove has two wall faces that intersect at a predetermined angle; and
the plasmon generator has: two slopes opposed to the two wall faces; an edge part defined by the two slopes intersecting each other; and a near-field light generating part located at an end of the edge part and generating near-field light,
the near-field light generator being configured so that the light propagating through the core is totally reflected at the top surface of the core to cause evanescent light to occur from the top surface of the core, and a surface plasmon is excited on the edge part through coupling with the evanescent light, the surface plasmon propagates along the edge part to the near-field light generating part, and the near-field light generating part generates near-field light based on the surface plasmon,
the method comprising the steps of:
forming the core;
forming the cladding; and
forming the plasmon generator, wherein:
the step of forming the cladding includes the steps of:
forming a layer to be etched, the layer to be etched being made of a dielectric material and having a top surface;
forming an etching mask on the top surface of the layer to be etched, the etching mask having an opening; and
taper-etching a portion of the layer to be etched, the portion being exposed from the opening, by reactive ion etching so that the groove is formed in the layer to be etched and the layer to be etched thereby becomes the cladding layer, wherein:
the step of taper-etching employs an etching gas containing a first gas contributing to the etching of the layer to be etched and a second gas contributing to deposition of a sidewall protective film, and changes, during the step, a ratio of a flow rate of the second gas to a flow rate of the first gas so that the ratio increases;
the layer to be etched is made of $SiO_2$ or SiON;
the etching mask contains elemental Al; and
the second gas contains $N_2$.

6. The method of manufacturing the near-field light generator according to claim 5, wherein the step of taper-etching increases the ratio of the flow rate of the second gas to the flow rate of the first gas in a stepwise manner.

7. The method of manufacturing the near-field light generator according to claim 5, wherein the step of taper-etching increases the ratio of the flow rate of the second gas to the flow rate of the first gas in a stepless manner.

8. The method of manufacturing the near-field light generator according to claim 5, wherein the first gas contains $Cl_2$ and $BCl_3$.

* * * * *

UNITED STATES PATENT AND TRADEMARK OFFICE
CERTIFICATE OF CORRECTION

PATENT NO. : 8,921,232 B2  
APPLICATION NO. : 14/189574  
DATED : December 30, 2014  
INVENTOR(S) : Hironori Araki et al.

Page 1 of 1

It is certified that error appears in the above-identified patent and that said Letters Patent is hereby corrected as shown below:

On the Title Page of the Patent, please delete "(73) Assignee: Milipitas"

and insert --(73) Assignee: HEADWAY TECHNOLOGIES, INC., Milpitas, California--

Signed and Sealed this
Twenty-second Day of December, 2015

Michelle K. Lee
*Director of the United States Patent and Trademark Office*